(12) United States Patent
Yamada

(10) Patent No.: US 7,319,564 B2
(45) Date of Patent: Jan. 15, 2008

(54) OBJECTIVE LENS DRIVING APPARATUS

(75) Inventor: Tsukasa Yamada, Sagamihara (JP)

(73) Assignee: Mitsumi Electric Co., Ltd., Tema-shi (JP)

( * ) Notice: Subject to any disclaimer, the term of this patent is extended or adjusted under 35 U.S.C. 154(b) by 678 days.

(21) Appl. No.: 10/789,499

(22) Filed: Feb. 26, 2004

(65) Prior Publication Data

US 2005/0013211 A1    Jan. 20, 2005

(30) Foreign Application Priority Data

Jul. 17, 2003    (JP)    ............... 2003-275821

(51) Int. Cl.
   *G02B 7/02*    (2006.01)
(52) U.S. Cl. ............... 359/824; 359/814; 369/44.15; 369/44.16; 369/44.19; 369/44.21; 720/681; 720/682; 720/683
(58) Field of Classification Search ............... 359/814, 359/824; 369/44.15, 44.16, 44.19, 44.21; 720/681–683
See application file for complete search history.

(56) References Cited

U.S. PATENT DOCUMENTS

| 5,463,501 | A | 10/1995 | Suzuki |
| 6,857,127 | B2 * | 2/2005 | Lee et al. ............... 720/683 |
| 2003/0210641 | A1 | 11/2003 | Shinozuka |
| 2004/0004774 | A1 | 1/2004 | Fujita |
| 2004/0130976 | A1 | 7/2004 | Tanaka |

FOREIGN PATENT DOCUMENTS

JP    2001-93177 A    4/2001

* cited by examiner

*Primary Examiner*—Hung X. Dang
*Assistant Examiner*—Joseph Martinez
(74) *Attorney, Agent, or Firm*—Frishauf, Holtz, Goodman & Chick, P.C.

(57) ABSTRACT

In an objective lens driving apparatus which includes a lens holder (22) provided with a plurality of coils (23, 24) and swingably supported by a suspension wire (28), and a magnet (27) for supplying a driving force to the lens holder by an electromagnetic action produced between the magnet and the coils, the center (Mc) of the magnet in a height direction is located above the center (Dc) of driving of the lens holder.

4 Claims, 8 Drawing Sheets

OBJECTIVE LENS DRIVING APPARATUS

This application claims priority to prior Japanese application JP 2003-275821, the disclosure of which is incorporated herein by reference.

BACKGROUND OF THE INVENTION

This invention relates to an objective lens driving apparatus used in an optical pickup for an optical disk drive.

An optical disk drive is an apparatus for reading information recorded in an optical disk (such as CD, CD-ROM, CD-R, CD-RW, DVD-ROM, DVD+R, DVD-R, DVD-RAM, DVD+RW, and DVD-RW) and writing information into the optical disk. The optical disk drive of the type has an optical pickup for irradiating a laser beam onto the optical disk and detecting a reflected beam from the optical disk in order to read information from the optical disk and write information into the optical disk.

Generally, the optical pickup comprises a laser source for emitting the laser beam and an optical system for guiding the laser beam to the optical disk and guiding the reflected beam to an optical detector. The optical system contains an objective lens faced to the optical disk.

The objective lens used in the optical pickup must be accurately controlled in position with respect to a focusing direction along an optical axis and a tracking direction along a radial direction of the optical disk so as to precisely converge or focus the laser beam onto a recording surface (track) of the optical disk which is rotated. Recently, following the improvement in recording density, there is an increasing demand for removal or suppression of the influence of warping of the optical disk. Therefore, the objective lens must be controlled in tilt also.

The objective lens is held and driven by an objective lens driving apparatus. The objective lens driving apparatus comprises a lens holder holding the objective lens and a plurality of suspension wires elastically supporting the lens holder so as to enable focusing control, tracking control, and tilting control. The lens holder is provided with a focusing coil, a tracking coil, and a tilting coil each of which is wound on or attached to the lens holder. Each of these coils is partly located within a gap of a magnetic circuit. With the above-mentioned structure, the objective lens driving apparatus can finely control the position and the tilt of the objective lens by controlling an electric current flowing through each of the coils (for example, see Japanese Patent Application Publication (JP-A) 2001-93177).

Hereinafter, a conventional objective lens driving apparatus disclosed in the above-mentioned publication will be described with reference to the drawing.

Figure 1:
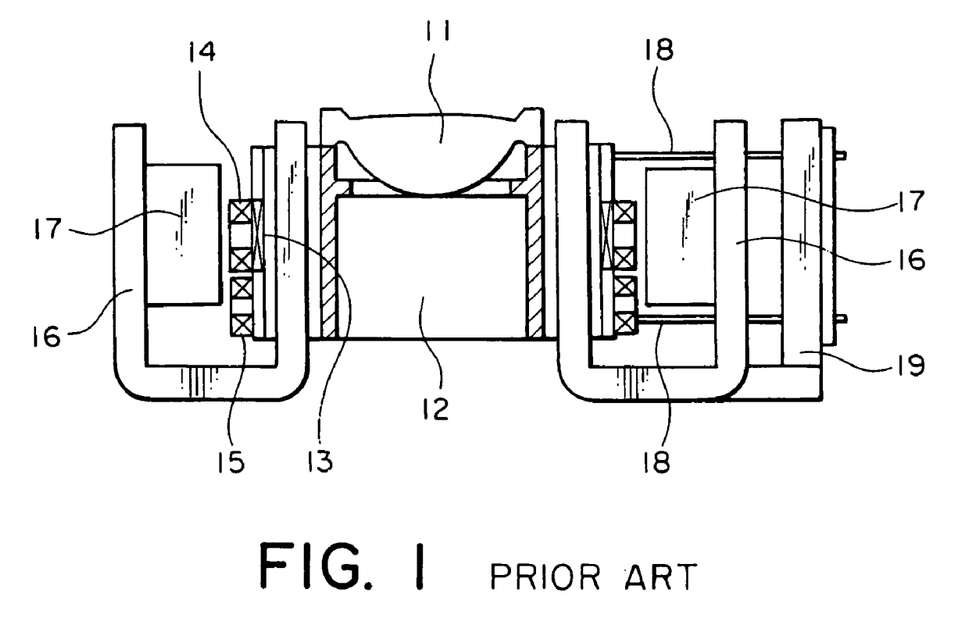
FIG. 1 is a sectional view of a conventional objective lens driving apparatus.

Referring to FIG. 1, the conventional objective lens driving apparatus comprises an objective lens 11, a lens holder 12, a focusing coil 13, a plurality of tracking coils 14, a plurality of tilting coils 15, a pair of yokes 16, a pair of magnets 17, a plurality of suspension wires 18, and a base 19.

The objective lens 11 is disposed on an upper surface of the lens holder 12. The focusing coil 13 is wound around side surfaces of the lens holder 12. The tracking coils 14 and the tilting coils 15 are attached to the side surfaces of the lens holder 12.

Each of the suspension wires 18, four in number (two of them being illustrated in the figure), has one end fixed to the lens holder 12 and the other end fixed to the base 19. With this structure, the lens holder 12 is elastically supported to be movable in the focusing direction (up-and-down direction in the figure) and in the tracking direction (forward-and-rearward direction in the figure) and to be tiltable in the radial direction of the optical disk (circumferential direction of a rotation axis extending in the leftward-and-rightward direction in the figure).

A combination of one of the yokes 16 and one of the magnets 17 forms a magnetic circuit. Likewise, a combination of the other yoke 16 and the other magnet 17 forms another magnetic circuit. In a magnetic gap in each of the magnetic circuits, each of the focusing coil 13, the tracking coils 14, and the tilting coils 15 is partly located.

In the above-mentioned structure, when each of the focusing coil 13, the tracking coils 14, and the tilting coils 15 is supplied with an appropriate electric current, the lens holder 12 (and the objective lens 11) can be moved and/or tilted in response to the electric current. As a consequence, the laser beam can be properly focused on a track on a recording surface of the optical disk.

As described above, the lens holder is supported by the four suspension wires in a cantilevered fashion. Therefore, when focusing shift by the focusing control and tracking shift by the tracking control simultaneously occur, a force twisting the suspension wires (in the radial direction) is produced. This force makes the lens holder (i.e., the objective lens) be tilted with respect to the optical disk.

The tilting coil may be used in order to correct such tilting. However, if the magnitude of tilting (tilt change) is large, correction is impossible. Therefore, in order to prevent the shift of the lens holder from being significantly biased in a specific direction, the magnets are disposed so that their centers in a height direction are coincident with the center of driving (neutral position) of the lens holder.

In the meanwhile, a two-wavelength optical pickup is known which is adaptable for both of a CD (Compact Disk) and a DVD (Digital Video or Versatile Disk). In the two-wavelength optical pickup, the position of the objective lens in the focusing direction must be changed between the CD and the DVD as the optical disk. In other words, an objective lens driving apparatus used in the two-wavelength optical pickup must have two reference positions (reference of driving) for the CD and the DVD. It is assumed here that one of these reference positions is coincident with the center of driving of the lens holder. In this event, the other reference position is widely separated from the center of driving and the displacement caused by the focusing control and the tracking control will be large. Thus, if a position separated from the center of driving is used as the reference position, a large force exceeding an allowable range may possibly be produced in the radial direction if the shift of the lens holder is great. In view of the above, in the objective lens driving apparatus used in the two-wavelength optical pickup, the center of driving of the lens holder is located between the reference positions for the CD and the DVD. More specifically, the reference position for the CD is nearer to the optical disk than the center of driving while the reference position for the DVD is further from the optical disk than the center of driving.

However, due to production variation, the objective lens driving apparatus used in the two-wavelength optical pickup may sometimes exhibit a tilt change beyond an allowable range if the lens holder is shifted by a predetermined amount. Thus, the objective lens driving apparatus is disadvantageous in that a margin for the tilt change is small.

SUMMARY OF THE INVENTION

It is therefore an object of this invention to provide an objective lens driving apparatus increased in margin for a tilt change and to thereby reduce a tilt defect rate.

According to this invention, there is provided an objective lens driving apparatus comprising a lens holder (22) provided with a plurality of coils (23, 24, 25) and swingably supported by a suspension wire (28), and a magnet (27) for supplying a driving force to the lens holder by an electromagnetic action produced between the magnet and the coils, wherein the center of the magnet (Mc) in a height direction is located above the center of driving (Dc) of the lens holder.

In the objective lens driving apparatus, the center of the magnet in the height direction is located above both of CD and DVD reference positions of the lens holder.

The reference numerals in parentheses are affixed merely to facilitate the understanding of this invention and do not restrict this invention at all.

According to this invention, the center of the magnet in the height direction is located above the center of driving of the lens holder so that a tilt change with respect to a shift of the lens holder can be reduced as compared with the conventional apparatus. As a consequence, a margin for the tilt change can be increased so as to reduce a tilt defect rate upon production.

DESCRIPTION OF THE PREFERRED EMBODIMENT

Now, description will be made of one embodiment of this invention with reference to the drawing.

Figure 2:
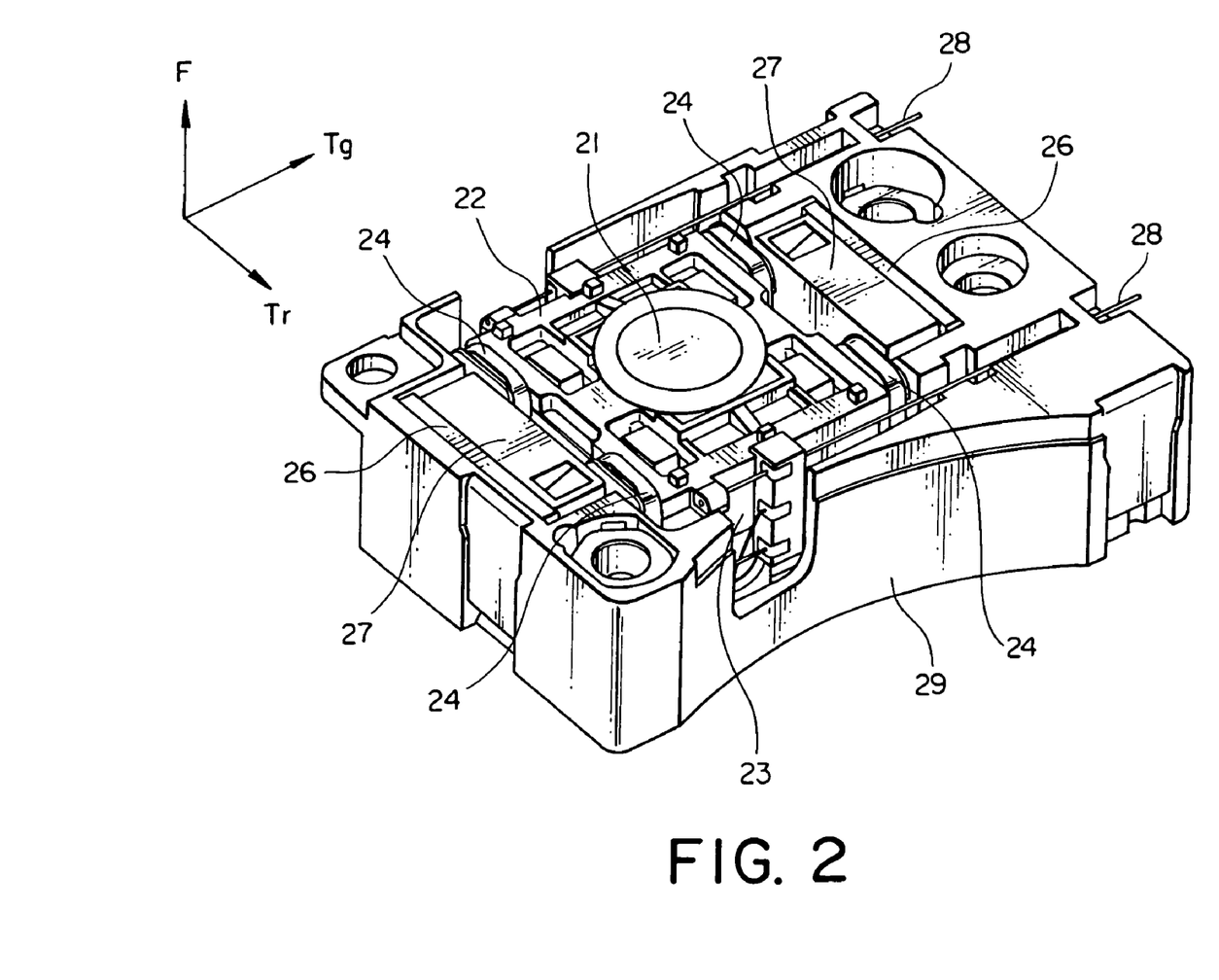
FIG. 2 is a perspective view of an objective lens driving apparatus according to one embodiment of this invention in the state where a top cover is removed.

Referring to FIG. 2, an objective lens driving apparatus according to one embodiment of this invention comprises an objective lens 21, a lens holder 22 holding the objective lens 21, a focusing coil 23, a plurality of tracking coils 24, a plurality of tilting coils 25 (FIG. 5), a pair of yokes 26, a pair of magnets 27, a plurality of suspension wires 28, a base 29, and a top cover (not shown).

Figure 3:
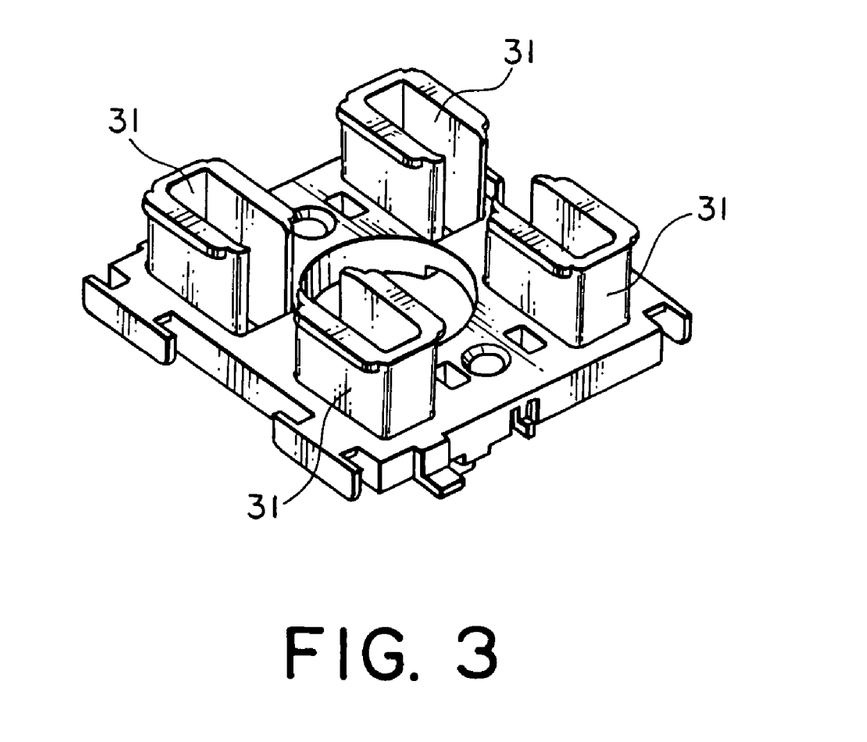
FIG. 3 is an exploded perspective view of a lens holder used in the objective lens driving apparatus illustrated in FIG. 2.

The tilting coils 25 are located inside the focusing coil 23. Specifically, the lens holder 22 comprises two members separable in a vertical direction as shown in FIG. 3. The tilting coils 25 are respectively wound around four tilting coil bobbins 31 formed on one of the members. The focusing coil 23 is wound around a whole of the four tilting coil bobbins 31 each of which is provided with the tilting coil 25 wound therearound. Thus, a combination of the four tilting coil bobbins 31 serves as a single focusing coil bobbin.

Figure 4:
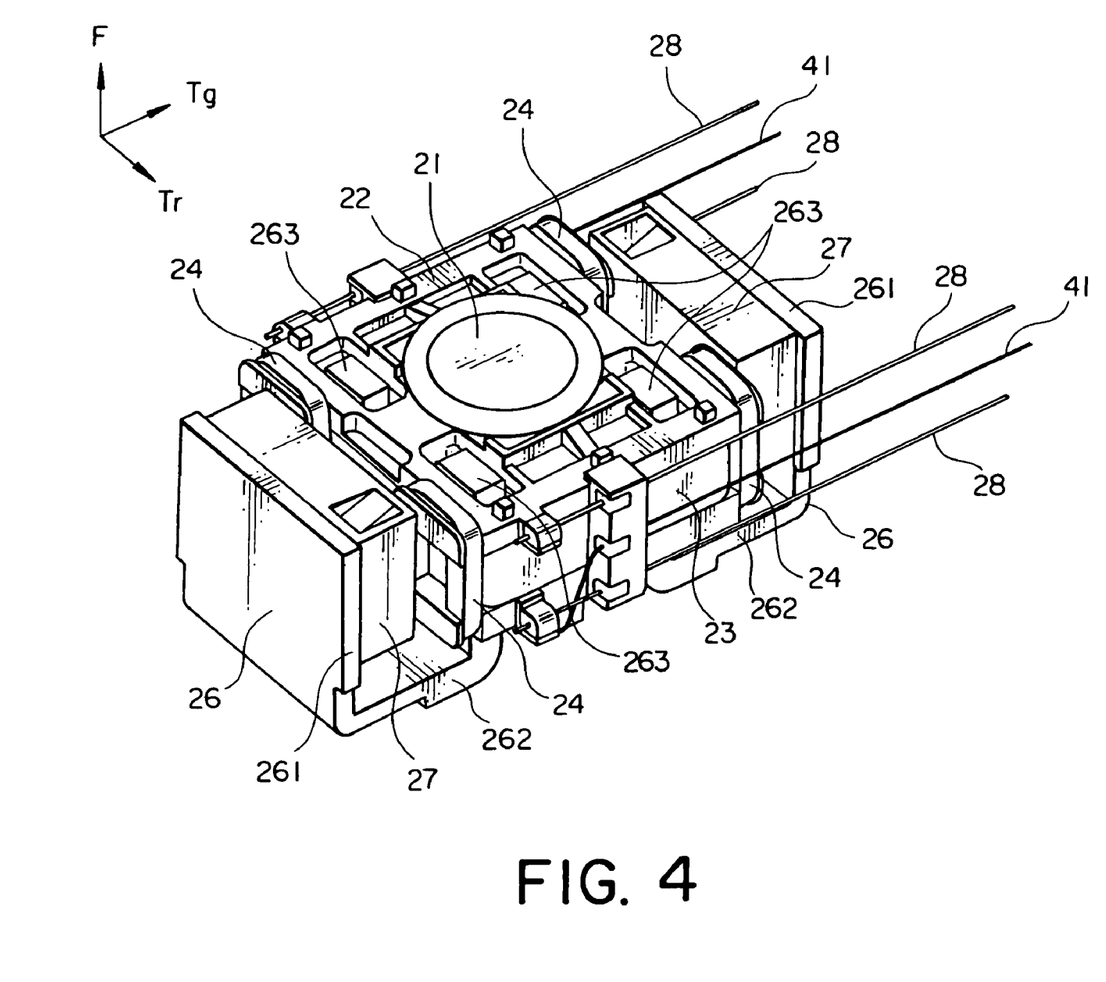
FIG. 4 is a perspective view of the objective lens driving apparatus in the state where a base is removed.

Referring to FIG. 4, the base 29 is removed from the objective lens driving apparatus illustrated in FIG. 2.

As will be understood from FIG. 4, the lens holder 22 is fixed to one ends of the four suspension wires 28. The other ends of the suspension wires 28 are fixed to the base 29. Thus, the lens holder 22 is supported in a cantilevered fashion to be swingable with respect to the base 29.

On the lens holder 22, the focusing coil 23, the tracking coils 24, and the tilting coils 25 are wound. The suspension wires 28 are electrically connected to end portions of the focusing coil 23 and the tracking coils 24. The tilting coils 25 are electrically connected to lead lines 41 arranged in parallel to the suspension wires 28.

Each of the yokes 26 has a flat plate portion 261 fixed to the base 29, a bottom plate portion 262 extending from an edge of the flat plate portion 261 to be perpendicular to the flat plate portion 261, and a U-shaped plate portion 263 extending from an edge of the bottom plate portion 262 to be parallel to the flat plate portion 261. The U-shaped plate portion 263 has two arms inserted into rectangular holes formed in the lens holder 22.

The magnet 27 is fixed on a surface of the flat plate portion 261 of the yoke 26 which is faced to the U-shaped plate portion 263.

The objective lens driving apparatus is mounted to an optical base of an optical disk drive (not shown) to form an optical pickup. The optical base is attached to a guide bar to be movable in a radial direction (tracking direction Tr) of an optical disk (71 in FIGS. 7 and 8) introduced into the optical disk drive. The optical base is provided with a laser diode, an optical detector, and a predetermined optical system. A laser beam from a laser diode is irradiated through the objective lens 21 to the optical disk and a reflected beam reflected from the optical disk is directed to the optical detector.

By appropriately controlling an electric current supplied to each of the focusing coil 23, the tracking coils 24, and the tilting coils 25 wound on the lens holder 22, the lens holder 22 is tilted in the tracking direction (Tr) (rotated around a rotation axis parallel to a tangential direction Tg), moved in the tracking direction (Tr), or moved in a focusing direction (F) in accordance with the relationship between each coil and magnetic fields produced by the yokes 26 and the magnets 27.

Next, description will be made in detail about the arrangement of the lens holder 22 (or the coils 23, 24, and 25) and the magnets 27 (and the yokes 26).

Figure 5:
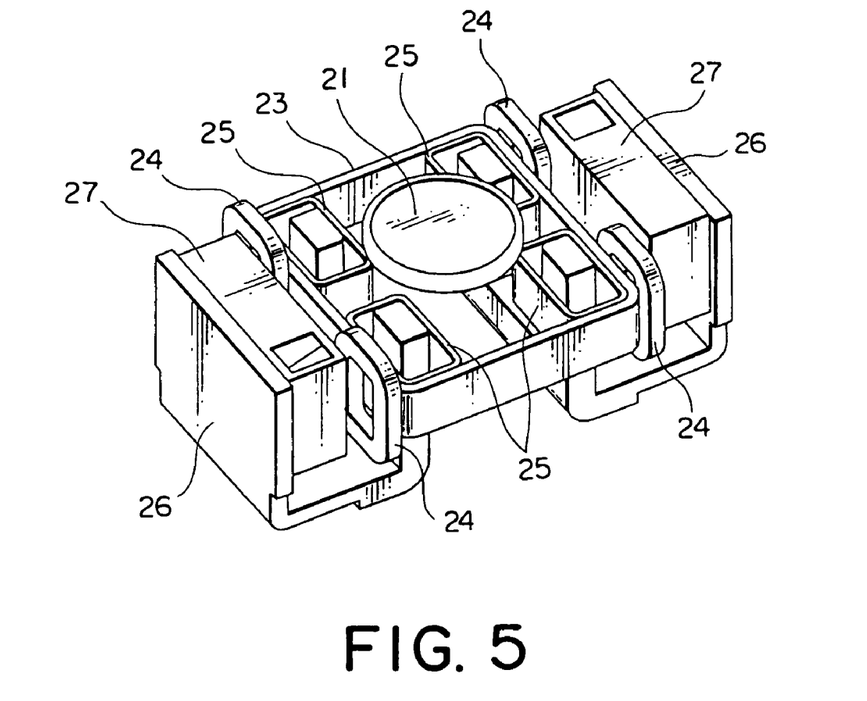
FIG. 5 is a perspective view showing the positional relationship between each coil and a magnet.
Figure 6:
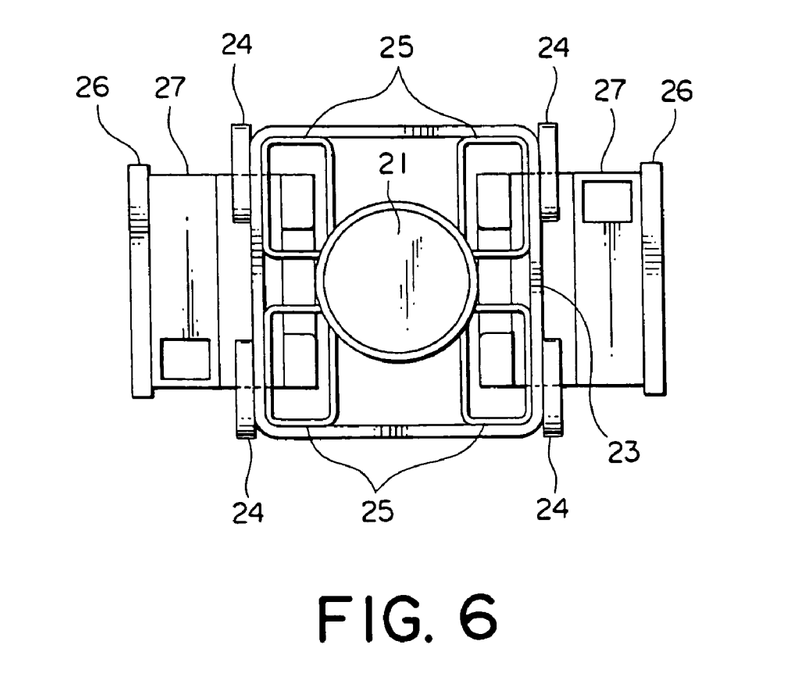
FIG. 6 is a plan view showing the positional relationship between each coil and the magnet.
Figure 7:
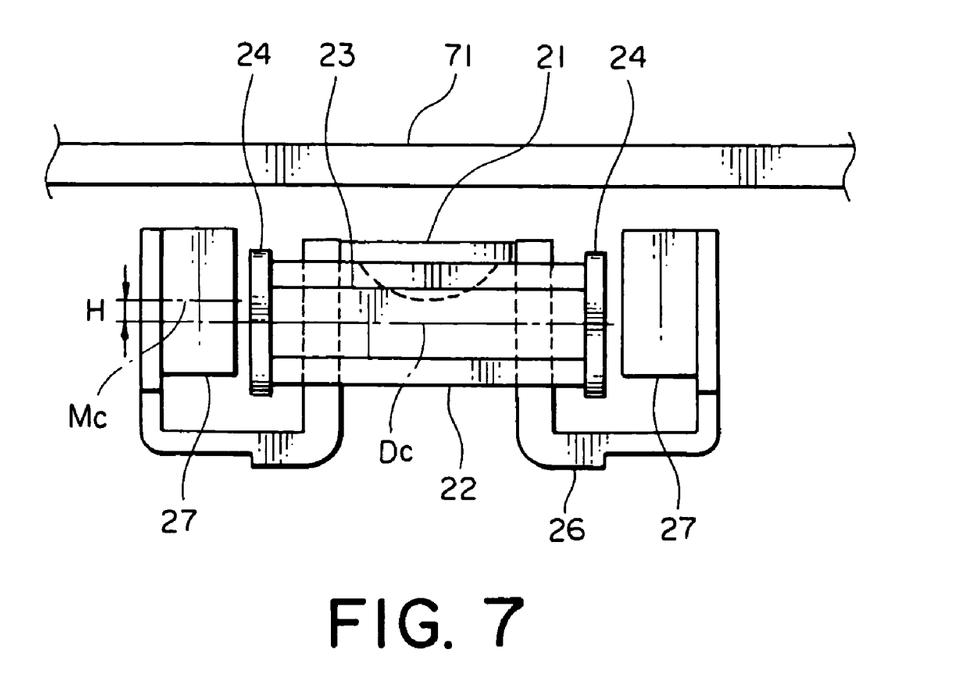
FIG. 7 is a side view showing the positional relationship between each coil and the magnet.

Referring to FIGS. 5 through 7, the lens holder 22 is in a neutral position when all of the coils 23, 24, and 25 are supplied with no electric current.

As will be understood from FIG. 6, the lens holder 22 and the magnets 27 are arranged so that the center of the lens holder 22 in the tracking direction (up-and-down direction in the figure) is coincident with the centers of the magnets 27 in the tracking direction. At this time, end faces of the magnets 27 in the tracking direction are coincident with the centers of the tracking coils 24 in the tracking direction, respectively.

As will be understood from FIG. 7, the lens holder 22 and the magnets 27 are arranged so that the center of the magnet Mc in a height direction (focusing direction) is located at an upper position (near to the optical disk 71) higher than the center of driving Dc of the lens holder 22 by a distance H (for example, 0.6 mm in case where each magnet has a height of 4.2 mm and a thickness of 2.1 mm). If the objective lens 21 is located at a position same as that of the conventional apparatus, the magnet 27 is located nearer to the optical disk 71 than in the conventional apparatus.

Next, description will be made about why the center of the magnet 27 in the height direction is located at the upper position higher than the center of driving of the lens holder 22 by the distance H.

Figure 8:
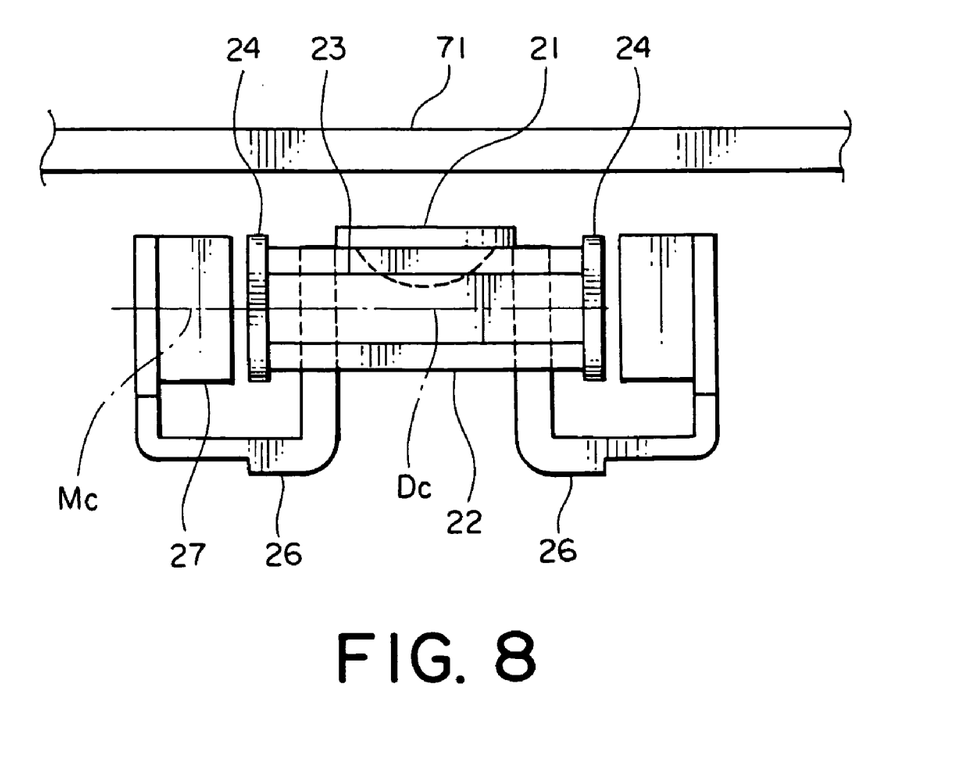
FIG. 8 is a side view similar to FIG. 7 but showing the positional relationship in a comparative example.

As illustrated in FIG. 8, preparation was made of an objective lens driving apparatus in which the center of the magnet in the height direction was coincident with the center of driving of the lens holder 22 in the manner similar to the conventional apparatus. Then, tilt characteristics were measured.

Figure 9:
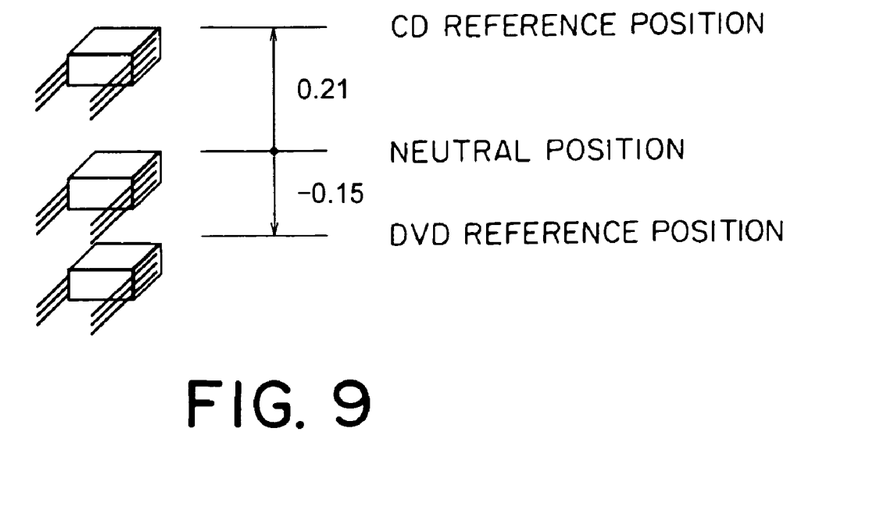
FIG. 9 is a view for describing the relationship among a CD reference position, a DVD reference position, and a neutral position upon measurement of tilt characteristics.
Figure 10:
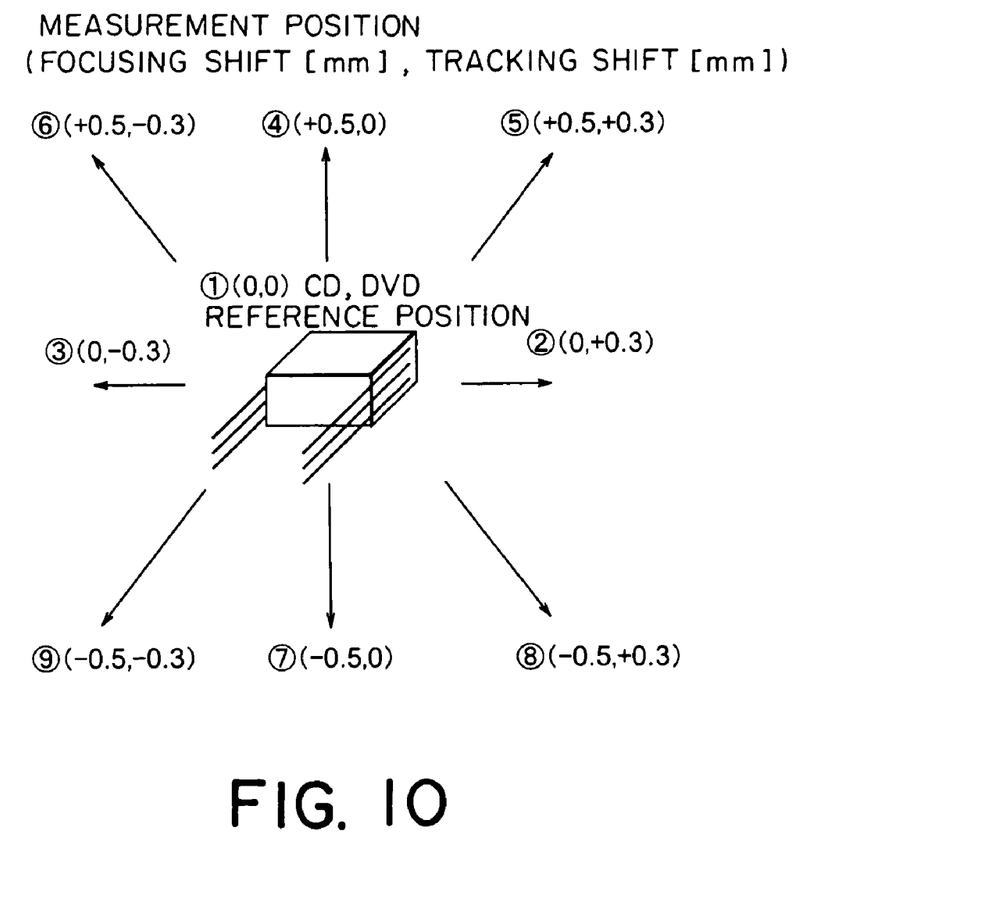
FIG. 10 is a view for describing the displacement of the lens holder upon measurement of the tilt characteristics.

Referring to FIG. 9, measurement was carried out in the following manner. With reference to the neutral position (center of driving) of the lens holder as a reference, the CD reference position and the DVD reference position were determined. From each of the reference positions, the lens holder 22 was shifted as shown in FIG. 10. Then, the tilt was measured by an autocollimator. The result is shown in FIG. 11.

Figure 11:
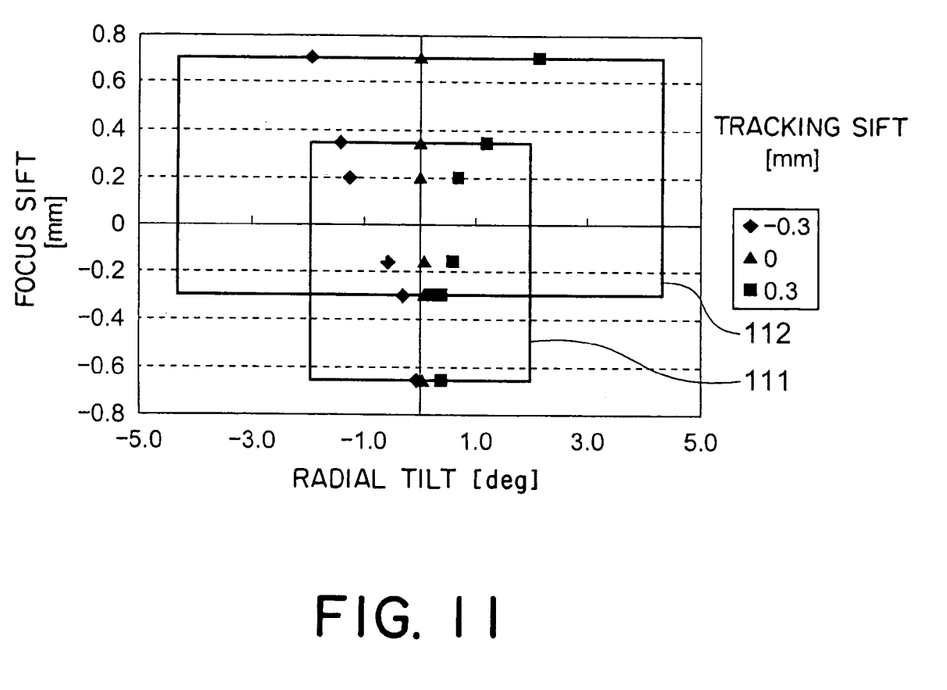
FIG. 11 is a graph showing the result of measurement of the tilt characteristics.

Referring to FIG. 11, a range 111 is a tilt allowance range in case where the optical disk is a DVD. A range 112 is a tilt allowance range in case where the optical disk is a CD.

As will be understood from FIG. 11, the tilt is greater as the focusing shift is greater in case where the focusing shift has a positive value. On the other hand, the tilt is smaller as the focusing shift is greater in case where the focusing shift has a negative value. Thus, the tilt change is not symmetrical between upward displacement and downward displacement the lens holder 22 from the neutral position. Presumably, this is because the yokes 26 are not present above the magnets 27 and the coils 23, 24, and 25.

In any event, it is understood from FIG. 11 that a margin for the tilt change is increased if the CD reference position and the DVD reference position are lowered. Therefore, in this embodiment, the magnets 27 are located at a higher position so as to achieve the effect equivalent to that obtained by lowering the CD reference position and the DVD reference position.

If the center of the magnet 27 in the height direction is higher than the center of driving of the lens holder 22, the effect of this invention is obtained. However, in order that the tilt defect rate due to production variation is suppressed to be substantially equal to zero, the distance H must be equal to or greater than 0.5 mm. On the other hand, if the position of the magnet 27 is excessively high, the tilt is gradually increased as the focusing shift is greater even if the focusing shift has a negative value. Therefore, in order that the defect rate due to production variation is substantially equal to zero, the distance H must be equal to or smaller than 0.7 mm.

From the reason mentioned above, in the objective lens driving apparatus according to this embodiment, the center of the magnet in the height direction is 0.6 mm higher than that of the center of driving of the lens holder 22. Furthermore, the center of driving (neutral position) of the lens holder 22 is used as the DVD reference position. The CD reference position is 0.36 mm higher than the DVD reference position and is located below the center of the magnet in the height direction. With this structure, in the objective lens driving apparatus according to this embodiment, occurrence of tilt defect products due to production variation can be substantially completely prevented.

Although this invention has been described in conjunction with the preferred embodiment thereof, it will readily be understood for those skilled in the art to put this invention into practice in various other manners with the scope of the appended claims.

What is claimed is:

1. An objective lens driving apparatus comprising:
  a lens holder which is provided with a plurality of coils, and which holds an objective lens that faces an optical disc, and which is swingably supported by at least one suspension wire, and
  a magnet which supplies a driving force to said lens holder by an electromagnetic action produced between said magnet and said coils,
  wherein a center of said magnet in a height direction is located nearer to said optical disc than a center of driving of said lens holder when said lens holder is in a neutral position in which all of said coils are supplied with no electric current.

2. An objective lens driving apparatus as claimed in claim 1, wherein the center of said magnet in the height direction is located nearer to said optical disc than both of CD and DVD reference positions of said lens holder when said lens holder is in said neutral position.

3. An objective lens driving apparatus as claimed in claim 2, wherein said DVD reference position is coincident with the center of driving of said lens holder when said lens holder is in said neutral position.

4. An objective lens driving apparatus as claimed in claim 1, wherein a distance between the center of said magnet in the height direction and the center of driving of said lens holder falls within a range between 0.5 mm and 0.7 mm when said lens holder is in said neutral position.

* * * * *